United States Patent
Lu et al.

(10) Patent No.: US 11,828,407 B2
(45) Date of Patent: Nov. 28, 2023

(54) ANGLE ADJUSTMENT APPARATUS AND TV MOUNTING BRACKET THEREOF

(71) Applicant: SHENZHEN BESTQI INNOVATION TECHNOLOGY CO., LTD, Shenzhen (CN)

(72) Inventors: Chengan Lu, Shenzhen (CN); Yaqi Lv, Shenzhen (CN)

(73) Assignee: SHENZHEN BESTQI INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/722,622

(22) Filed: Apr. 18, 2022

(65) Prior Publication Data

US 2023/0031835 A1 Feb. 2, 2023

(30) Foreign Application Priority Data

Jul. 27, 2021 (CN) .......................... 202110853062.7

(51) Int. Cl.
*F16M 11/12* (2006.01)

(52) U.S. Cl.
CPC ................................ *F16M 11/126* (2013.01)

(58) Field of Classification Search
CPC .. F16M 11/126; F16M 11/18; F16M 11/2014; F16M 11/2085; F16M 11/2092; F16M 13/02; F16M 11/10; F16M 11/38
USPC ...................................................... 248/122.1
See application file for complete search history.

(56) References Cited

U.S. PATENT DOCUMENTS

| | | | | |
|---|---|---|---|---|
| 7,175,146 | B2 * | 2/2007 | Kim ...................... | F16M 11/10 211/100 |
| 7,663,868 | B1 * | 2/2010 | Lam ..................... | H05K 5/0204 361/679.06 |
| D930,006 | S * | 9/2021 | Pei .............................. | D14/452 |
| D936,045 | S * | 11/2021 | Xie .............................. | D14/239 |
| 2006/0291152 | A1 * | 12/2006 | Bremmon .............. | F16M 11/10 361/679.06 |
| 2007/0023599 | A1 * | 2/2007 | Fedewa .................. | F16M 13/02 248/289.11 |
| 2007/0262210 | A1 * | 11/2007 | Oh ......................... | F16M 11/28 248/917 |
| 2012/0241578 | A1 * | 9/2012 | Huang ................ | F16M 11/2014 248/279.1 |
| 2019/0191879 | A1 * | 6/2019 | Pei ..................... | F16M 11/2092 |
| 2022/0243867 | A1 * | 8/2022 | Tsorng ................... | F16M 11/18 |

* cited by examiner

Primary Examiner — Muhammad Ijaz

(57) ABSTRACT

An angle adjustment apparatus includes a first connector, a second connector, a first adjusting member, a second adjusting member, and a third adjusting member. The third end of the second connector is rotatably connected to the first end of the first connector through a pivot shaft. The first adjusting member is connected to the second end of the first connector. The second adjusting member is connected to the fourth end of the second connector. The third adjusting member is configured to adjust a distance between the second end of the first connector and the fourth end of the second connector. At least one of the first adjusting member and the second adjusting member is rotatably connected to the first connector corresponding thereto or the second connector corresponding thereto, and a rotation axis for the rotatable connection is parallel to the pivot shaft.

13 Claims, 5 Drawing Sheets

ANGLE ADJUSTMENT APPARATUS AND TV MOUNTING BRACKET THEREOF

CROSS-REFERENCE TO RELATED APPLICATIONS

This application claims priority to and/or benefit from Chinese patent application No. 202110853062.7, filed Jul. 27, 2021, entitled ANGLE ADJUSTMENT MECHANISM AND TV MOUNTING BRACKET THEREOF, the content of which is hereby incorporated by reference in its entirety.

TECHNICAL FIELD

The present disclosure relates to the field of mounting bracket technologies, and in particular, to an angle adjustment apparatus and a television (TV) mounting bracket including the same.

BACKGROUND

With the development of science and technology, since flat-panel TVs have advantages of small occupied space and light weight, the flat-panel TVs are more and more popularized. More and more families can use the flat-panel TVs for audio and video entertainment, and companies can use the flat-panel TVs to explain meetings and so on, greatly enriching and facilitating people's life.

Based on the advantages of the flat-panel TVs, the flat-panel TVs may be directly mounted to wall surfaces, so as to further reduce the occupied space of the flat-panel TVs during actual use. However, a conventional manner of mounting a flat-panel TV involves mounting a TV bracket with screws by drilling holes in a wall, and then fixing the TV to the bracket. Although the stability of the mounting of the TV may be realized in this manner, the TV is fixed to the bracket because the mounted bracket is fixed. As a result, an orientation and a tilt angle of the TV are fixed during actual use, which cannot meet usage requirements of users.

SUMMARY

According to various exemplary embodiments of the present disclosure, an angle adjustment apparatus and a TV mounting bracket including the same are provided.

An angle adjustment apparatus is provided, including:
a first connector having a first end and a second end;
a second connector having a third end and a fourth end, the third end of the second connector being rotatably connected to the first end of the first connector through a pivot shaft;
a first adjusting member, the first adjusting member being connected to the second end of the first connector;
a second adjusting member, the second adjusting member being connected to the fourth end of the second connector; and
a third adjusting member configured to adjust a distance between the second end of the first connector and the fourth end of the second connector;
wherein at least one of the first adjusting member and the second adjusting member is rotatably connected to the first connector corresponding thereto or the second connector corresponding thereto, and a rotation axis for the rotatable connection is parallel to the pivot shaft.

An angle adjustment apparatus is further provided, including:
a first connector having a first end and a second end and configured to be connected to a mounting surface;
a second connector having a third end and a fourth end and configured to be connected to a display device, the third end of the second connector being rotatably connected to the first end of the first connector through a pivot shaft; and
an adjusting component connected to the first connector and the second connector and configured to adjust a distance between the first connector and the second connector;
when the adjusting component adjusts the distance between the first connector and the second connector, at least one of the second end of the first connector and the fourth end of the second connector rotates with the adjusting component about a rotation axis parallel to the pivot shaft.

A TV mounting bracket includes the angle adjustment apparatus as described above and a connecting arm. The connecting arm has one end connected to the angle adjustment apparatus and the other end connected to a mounting surface.

Details of one or more embodiments of the present disclosure are set forth in the following accompanying drawings and descriptions. Other features, objects, and advantages of the present disclosure become obvious with reference to the specification, the accompanying drawings, and the claims.

BRIEF DESCRIPTION OF THE DRAWINGS

In order to more clearly illustrate the technical solutions in embodiments of the present disclosure or the conventional art, the accompanying drawings used in the description of the embodiments or the conventional art will be briefly introduced below. It is apparent that, the accompanying drawings in the following description are only some embodiments of the present disclosure, and those of ordinary skill in the art can derive other drawings from the accompanying drawings without creative efforts.

DETAILED DESCRIPTION

Figure 1:
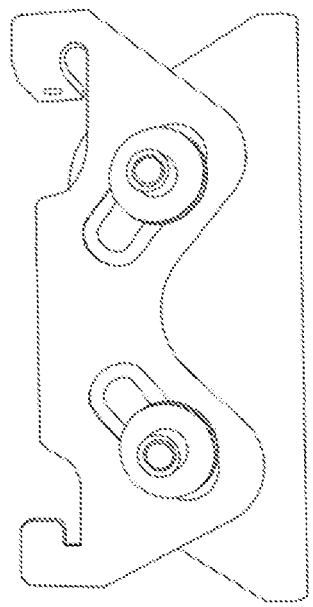
FIG. 1 is a schematic view of an angle adjustment apparatus in the prior art.

In order to make the above objectives, features and advantages of the present disclosure more obvious and understandable, specific implementations of the present disclosure are described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by the specific embodiment disclosed below.

In the description of the present disclosure, it should be understood that the orientation or position relationship indicated by the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

In addition, the terms "first" and "second" are used for descriptive purposes only, which cannot be construed as indicating or implying a relative importance, or implicitly specifying the number of the indicated technical features. Thus, the features defined with "first" and "second" may explicitly or implicitly include at least one of the features. In the description of the present disclosure, "a plurality of" means at least two, such as two or three, unless specifically stated otherwise.

In the present disclosure, unless otherwise expressly specified and limited, the terms "mount," "join," "connect", "fix", etc. should be understood in a broad sense, such as, a fixed connection, a detachable connection, or an integral connection; a mechanical connection or an electrical connection; a direct connection, an indirect connection through an intermediate medium, an internal connection of two elements, or an interaction of two elements, unless otherwise expressly limited. For those of ordinary skill in the art, the specific meanings of the foregoing terms in the present disclosure can be understood on a case-by-case basis.

In the present disclosure, unless otherwise explicitly specified and defined, the expression a first feature being "on" or "under" a second feature may be the case that the first feature is in direct contact with the second feature, or the first feature is in indirect contact with the second feature via an intermediate medium. Furthermore, the expression the first feature being "over", "above" and "on top of" the second feature may be the case that the first feature is directly above or obliquely above the second feature, or only means that the level of the first feature is higher than that of the second feature. The expression the first feature being "below", "underneath" or "under" the second feature may be the case that the first feature is directly underneath or obliquely underneath the second feature, or only means that the level of the first feature is lower than that of the second feature.

It is to be noted that, when one element is referred to as "fixed to" or "arranged on" another element, it may be directly disposed on the another element or an intermediate element may exist. When one element is considered to be "connected to" another element, it may be directly connected to the another element or an intermediate element may co-exist. The terms "vertical", "horizontal", "upper", "lower", "left", "right" used herein and similar expressions used herein are for illustrative purposes only and do not imply that they are the only means of implementation.

Referring to FIG. 1, FIG. 1 shows a solution of a waist groove and a sliding block generally used in a conventional angle adjustment apparatus in the prior art. That is, two connectors are provided with an arc-shaped waist groove and a sliding block respectively, and the sliding block is slid along the arc-shaped waist groove. Generally, in this solution, the two connectors are required to be partially bent, and the arc-shaped waist groove and the sliding block are provided at bent portions on the two connectors, respectively. The solution of a waist groove and a sliding block has a relatively serious structural strength problem. Since the bent portions are mostly thin and the interaction force between the waist groove and the sliding block during engagement is mainly in a plane where the bent portions are, the bent portions are prone to buckling due to insufficient strength. That is, the bent portions may bend and deform in their thickness directions. In addition, the bent portions are provided with long grooves that run through their thickness directions, which may further reduce the strength of the bent portions, leading to poor stability and seriously insufficient reliability of the whole angle adjustment apparatus in the prior art.

Figure 2:
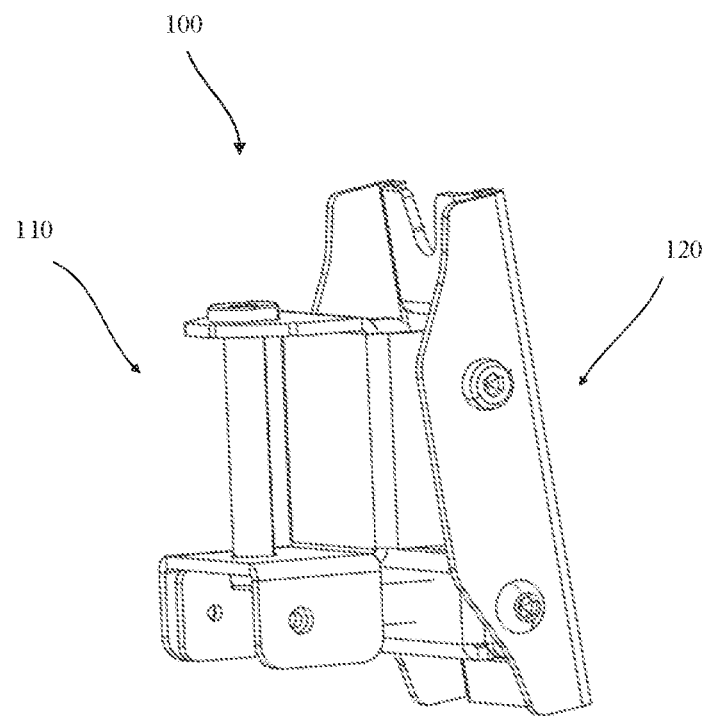
FIG. 2 is a schematic view of an angle adjustment apparatus according to an embodiment of the present disclosure.
Figure 3:
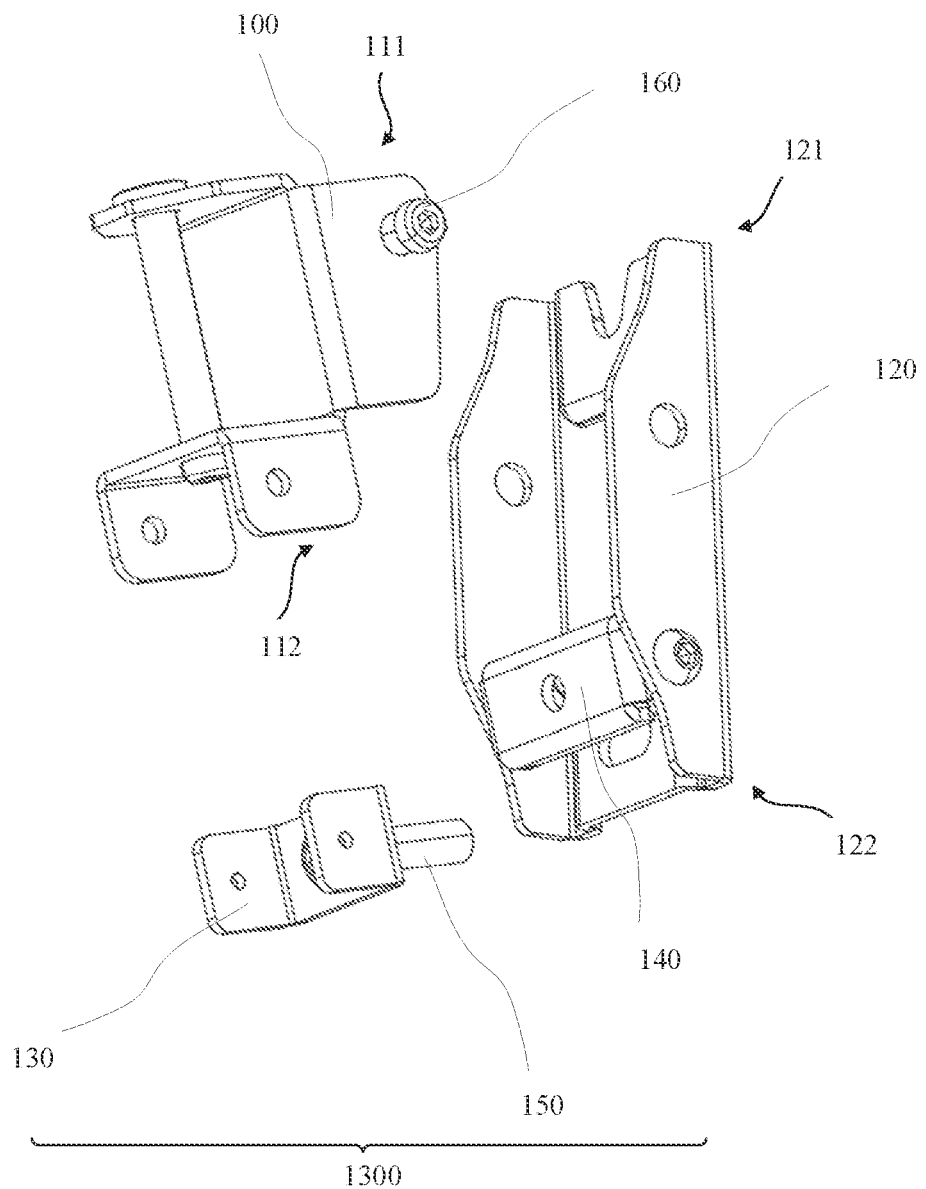
FIG. 3 is an exploded view of an angle adjustment apparatus according to an embodiment of the present disclosure.

As shown in FIG. 2 and FIG. 3, an angle adjustment apparatus 100 in an embodiment of the present disclosure includes a first connector 110, a second connector 120, and an adjusting component 1300 connected to the first connector 110 and the second connector 120. The first connector 110 is configured to be connected to a mounting surface, such as a wall, and has a first end 111 and a second end 112. The second connector 120 is configured to be connected to a wall-mounted item, such as a display device, and has a third end 121 and a fourth end 122. The third end 121 of the second connector 120 is rotatably connected to the first end 111 of the first connector 110 through a pivot shaft 160. When the adjusting component 1300 adjusts a distance between the first connector 110 and the second connector 120, at least one of the second end 112 of the first connector 110 and the fourth end 122 of the second connector 120 rotates with the adjusting component 1300 about a rotation axis parallel to the pivot shaft 160. In this embodiment, the adjusting component 1300 includes a first adjusting member 130, a second adjusting member 140, and a third adjusting member 150. The first adjusting member 130 is connected to the second end 112 of the first connector 110, and the second adjusting member 140 is connected to the fourth end 122 of the second connector 120. At least one of the first adjusting member 130 and the second adjusting member 140 is rotatably connected to the first connector 110 corresponding thereto or the second connector 120 corresponding thereto about the rotation axis, and the rotation axis for the rotatable connection is parallel to the pivot shaft 160. The third adjusting member 150 is configured to adjust a distance between the second end 112 of the first connector 110 and the fourth end 122 of the second connector 120.

In some embodiments, the first adjusting member 130 is fixedly connected to the second end 112 of the first connector 110 by soldering, and the second adjusting member 140 is rotatably connected to the fourth end 122 of the second connector 120. Since the first adjusting member 130 is fixed to the first connector 110 and the first connector 110 is connected to a mounting surface such as a wall, it can be considered that a position and an angle of the first adjusting member 130 always remain fixed. When the third adjusting member 150 causes the distance between the second end 112 of the first connector 110 and the fourth end 122 of the second connector 120 to increase, the second adjusting member 140 is away from the second end 112 of the first connector 110 and rotates clockwise as observed in FIG. 2 and FIG. 3, so as to ensure that the third adjusting member 150 can be stably connected between the first adjusting member 130 and the second adjusting member 140. During the motion of the second adjusting member 140, the fourth end 122 of the second connector 120 is driven to be synchronously away from the second end 112 of the first connector 110, so that an angle between the second connector 120 and the first connector 110 changes.

Similarly, in some other embodiments, the second adjusting member 140 is fixedly connected to the fourth end 122 of the second connector 120 by soldering, and the first adjusting member 130 is rotatably connected to the second end 112 of the first connector 110. Obviously, the principles of these embodiments are consistent with the above solution, the first adjusting member 130 can stably displace and rotate relative to the second adjusting member 140, driving the angle between the first connector 110 and the second connector 120 to change.

In some other embodiments, the first adjusting member 130 and the second adjusting member 140 are rotatably connected to the first connector 110 and the second connector 120 correspondingly. It is easy to understand that, in the foregoing embodiments, the first adjusting member 130 and the second adjusting member 140 both rotate and displace to some extent. The angle between the first connector 110 and the second connector 120 can be changed through cooperation between the first adjusting member 130 and the second adjusting member 140.

In the angle adjustment apparatus 100 according to the present disclosure, at least one of the first adjusting member 130 and the second adjusting member 140 is rotatably connected to the first connector 110 or the second connector 120. As a result, during the adjustment, the third adjusting member 150 can adapt to a change in the angle between the third adjusting member 150 and the first adjusting member 130 or the angle between the third adjusting member 150 and the second adjusting member 140, so that it is ensured that the distance between the first adjusting member 130 and the second adjusting member 140 can always be synchronously adjusted with the third adjusting member 150, so as to drive the distance between the second end 112 of the first connector 110 and the fourth end 122 of the second connector 120 to also be synchronously adjusted with the third adjusting member 150, thereby realizing the adjustment on the angle between the first connector 110 and the second connector 120. Compared with the prior art, during the angle adjustment of the angle adjustment apparatus 100 according to the present disclosure, the third adjusting member 150 is actually adjusted, and a change in the distance is more easily perceived and controlled than the change in the angle in the prior art, which enables the angle adjustment apparatus 100 according to the present disclosure to control the adjustment on the angle between the first connector 110 and the second connector 120 more accurately. In addition, since the distance between the first connector 110 and the second connector 120 is adjusted using the third adjusting member 150, the angle adjustment apparatus 100 according to the present disclosure is not required to provide bent portions with poor strength on the first connector 110 and the second connector 120 like the prior art. The angle adjustment apparatus 100 according to the present disclosure has better structural integration, more uniform force, and better stability. By arranging at least one of the first adjusting member 130 and the second adjusting member 140 to be rotatably connected to the first connector 110 corresponding thereto or the second connector 120 corresponding thereto, and arranging the rotation axis for the rotatable connection to be parallel to the pivot shaft 160, the force between the first adjusting member 130 and the first connector 110 and the force between the second adjusting member 140 and the second connector 120 are parallel, thereby ensuring the overall stability of the angle adjustment apparatus 100 during the adjustment on the third adjusting member 150.

It can be understood that the third adjusting member 150 may be implemented in many forms. In some embodiments, the third adjusting member 150 may be a common telescopic rod on the market. Both ends of a rod portion of the telescopic rod are connected to the first adjusting member 130 and the second adjusting member 140, respectively, and a length of the telescopic rod is adjusted through a fixing component of the telescopic rod.

Figure 4:
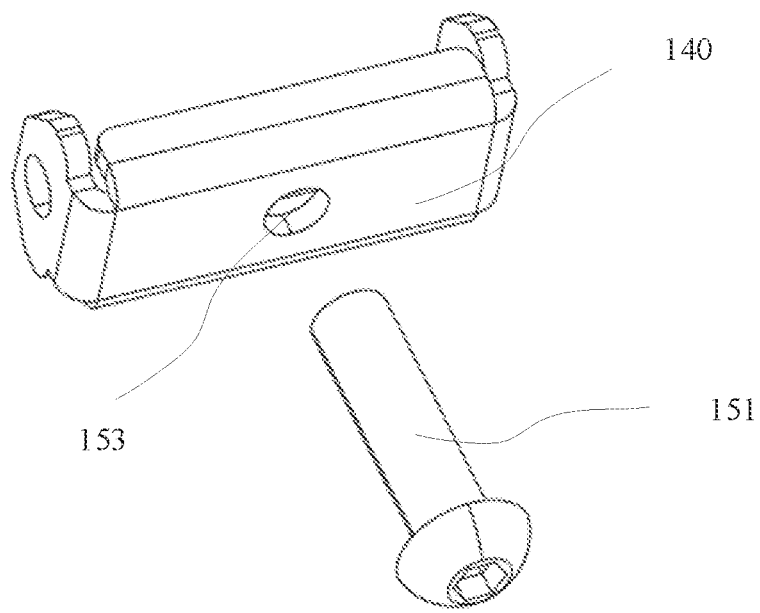
FIG. 4 is a schematic view of a third adjusting member according to an embodiment of the present disclosure.
Figure 5:
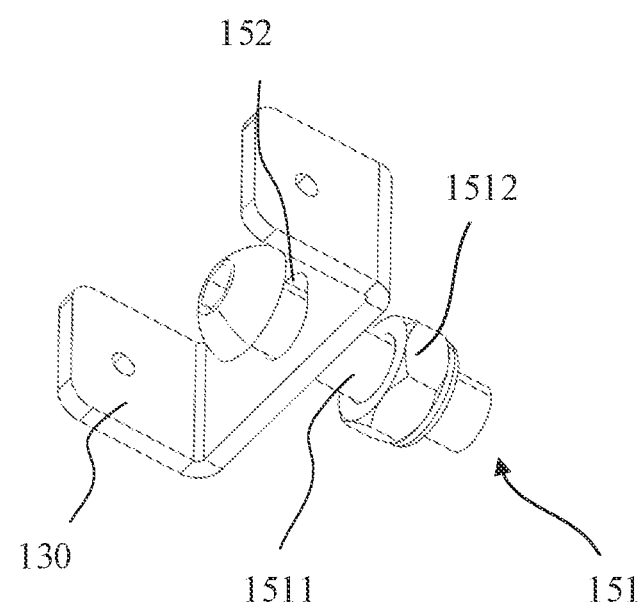
FIG. 5 is another schematic view of a third adjusting member according to an embodiment of the present disclosure.

In some other embodiments, referring to FIG. 4 and FIG. 5, which show schematic views of a connection relationship between the third adjusting member 150 and the first adjusting member 130 and a connection relationship between the third adjusting member 150 and the second adjusting member 140. Both ends of the third adjusting member 150 are threaded through and connected to the first adjusting member 130 and the second adjusting member 140. An extension direction of the third adjusting member 150 is perpendicular to the pivot shaft 160. When the distance between the first connector 110 and the second connector 120 is adjusted, the third adjusting member 150 rotates clockwise or counterclockwise in the extension direction thereof.

In this embodiment, the third adjusting member 150 can include a threaded connector 151, a positioning structure 152, and a threaded structure 153. In the first adjusting member 130 and the second adjusting member 140, one is provided with the positioning structure 152, and the other is provided with the threaded structure 153. The threaded connector 151 is connected to the positioning structure 152 at one end and is connected to the threaded structure 153 at the other end thereof. With the arrangement of the third adjusting member 150 having the above structure, the connection is more stable, and it is also more advantageous to fine adjustment of a telescopic length.

In some embodiments, as shown in FIG. 3, the threaded connector 151 is perpendicular to the pivot shaft 160. The pivot shaft 160 is parallel to the rotation axes of the first adjusting member 130 and the second adjusting member 140, and the forces of the threaded connector 151 for both the first adjusting member 130 and the second adjusting member 140 are perpendicular to said rotation axis, this means that the force between the first adjusting member 130 and the second adjusting member 140, the force between the first adjusting member 130 and the first connector 110, and the force between the second adjusting member 140 and the second connector 120 are all in the same line. In addition, no torsion and other conditions unfavorable to the stability occur between the components of the angle adjustment apparatus 100 according to the present disclosure, thereby further improving structural integration of the angle adjustment apparatus 100 and its better stability in use.

As shown in FIG. 4 and FIG. 5, in this embodiment, the threaded connector 151 includes a bolt 1511 and a nut 1512. The nut 1512 is arranged on a screw of the bolt 1511. The positioning structure 152 is a via hole arranged on the first adjusting member 130. The screw of the bolt 1511 passes through the via hole. A head of the bolt 1511 and the nut 1512 are arranged on two sides of the via hole, respectively, to fix the first adjusting member 130 to the bolt 1511. In this embodiment, the threaded structure 153 is a through screw hole arranged on the second adjusting member 140, and the threaded connector 151 can be in threaded connection with the screw hole.

In the foregoing embodiment, during the adjustment of the angle adjustment apparatus 100, the head of the bolt 1511 is turned so that the screw portion of the bolt 1511 is rotated in the screw hole. Since the first adjusting member 130 is fixed to a head portion of the bolt 1511 by the head and the nut 1512, rotation of the bolt 1511 causes the distance between the first adjusting member 130 and the second adjusting member 140 to change, thereby realizing the adjustment on the angle between the first connector 110 and the second connector 120. In addition, rotatable connections of the bolt 1511 with the first adjusting member 130 and the second adjusting member 140 form a match, so that the screw of the bolt 1511 can always be aligned with the screw hole, thereby preventing the problem of interlocking caused by dislocation between the threaded connector 151 and the screw hole and fully ensuring the stability of the use of the angle adjustment apparatus 100 according to the present disclosure.

In some embodiments, a tolerance is provided between the first adjusting member 130 and the third adjusting member 150. In the embodiment shown in FIG. 5, a tolerance is provided between the positioning structure 152 and the threaded connector 151. Specifically, the tolerance is formed by providing the via hole on the first adjusting member 130 with a hole diameter slightly larger than a diameter of the screw of the bolt 1511. In this way, even if the screw of the bolt 1511 deviates slightly from the screw hole, the screw can be re-aligned with the screw hole by fine adjustment of the position of the bolt 1511 in the via hole, which prevents interlocking caused by dislocation between the screw of the bolt 1511 and the screw hole, thereby increasing fault tolerance of the angle adjustment apparatus 100 according to the present disclosure, and making it more stable in operation.

Figure 8:
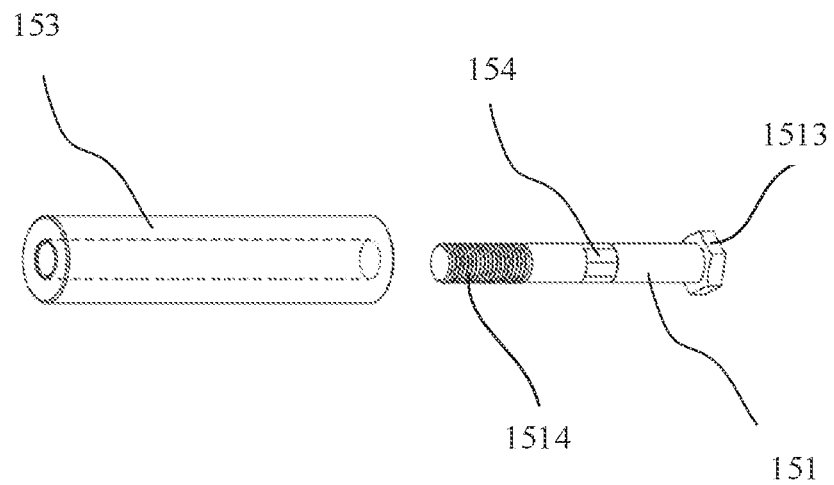
FIG. 8 is a schematic view of a third adjusting member according to another embodiment of the present disclosure.

It can be understood that the specific implementation form of the threaded connector 151, the positioning structure 152, and the threaded structure 153 is obviously not limited to the above manner. As shown in FIG. 8, in some embodiments, the positioning structure 152 is a via hole, the threaded structure 153 is an internal threaded sleeve, and the threaded connector 151 is provided with a limiting head 1513 at one end and a threaded segment 1514 at the other end. A hexagonal assembly portion 154, for example, is arranged between the limiting head 1513 and the threaded segment 1514. The threaded segment 1514 is configured to be in threaded connection with the internal threaded sleeve. The limiting head 1513 is configured to be connected to the fixing member. When using the angle adjustment apparatus 100, a user is only required to use a hexagonal wrench to turn the assembly portion 154 to realize the movement of the threaded connector 151 in the internal threaded sleeve, which is much easier to operate than the above solutions.

It is to be noted that, in the angle adjustment apparatus 100 according to the present disclosure, the specific implementations of the first connector 110, the second connector 120, and connections of the two and the pivot shaft 160 are not specifically limited.

Figure 6:
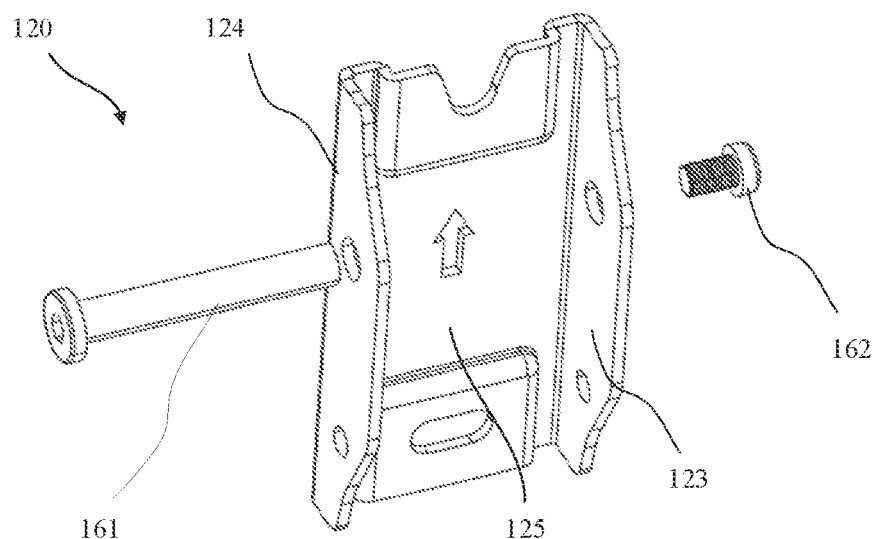
FIG. 6 is a schematic view of a second connector according to an embodiment of the present disclosure.

In some embodiments, as shown in FIG. 6, the pivot shaft 160 can include a pivot bolt 162 and a pivot threaded sleeve 161. The pivot threaded sleeve 161 and the pivot bolt 162 each include a limiting end and a threaded connection segment connected to the limiting end, and the pivot threaded sleeve 161 and the pivot bolt 162 are connected to each other through the threaded connection segments. The first connector 110 and the second connector 120 are sleeved on the threaded connection segments, and are arranged between the limiting ends of the pivot threaded sleeve 161 and the pivot bolt 162.

Figure 7:
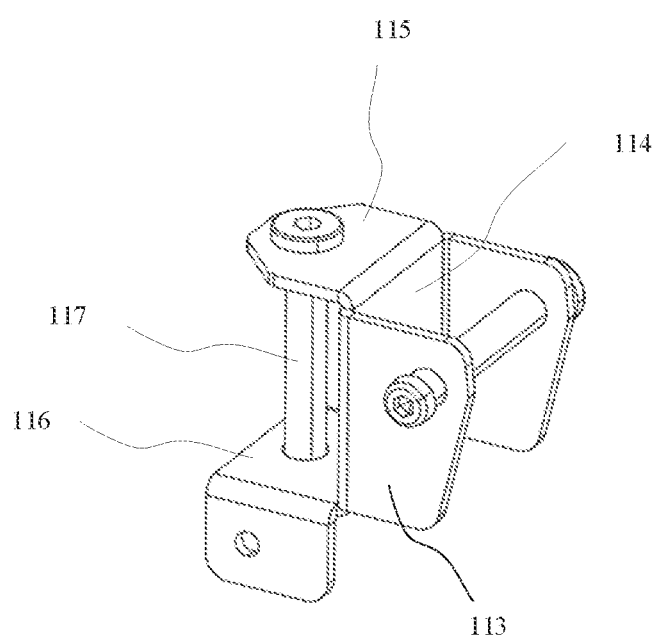
FIG. 7 is a schematic view of a first connector according to an embodiment of the present disclosure.

As shown in FIG. 6 and FIG. 7, the first connector 110 and the second connector 120 are respectively provided with a first pivot connection portion 113 and a second pivot connection portion 123, and the pivot shaft 160 runs through the first pivot connection portion 113 and the second pivot connection portion 123 to realize a pivot connection between the first connector 110 and the second connector 120.

In some embodiments, as shown in FIG. 7, the first connector 110 further includes a first connection body 114 extending in a vertical direction, and the first connection body 114 are respectively provided with a first top plate 115 and a first bottom plate 116 extending toward a same side at both ends of the first connection body 114. The "extending toward a same side" may mean, for example, extending along a left side of the first connection body 114 in FIG. 7. A third connector 117 is arranged between the first top plate 115 and the first bottom plate 116. The third connector 117 is configured to be connected to a wall. The first adjusting member 130 is arranged below the first bottom plate 116.

In the foregoing embodiment, the angle adjustment apparatus 100 not only provides a mounting space for the third connector 117, but also enables the third adjusting member 150 connected to the first adjusting member 130 to have a longer telescopic range by arranging the first adjusting member 130 to be appropriately away from the first connection body 114, so as to adjust the angle between the first connector 110 and the second connector 120 more accurately. By arranging the first adjusting member 130 below the first bottom plate 116, the first adjusting member 130 can have a larger rotation range in the case that the first adjusting member 130 is rotatably connected to the first bottom plate 116, enabling the first adjusting member 130, the second adjusting member 140, and the third adjusting member 150 to have better matching conditions. Moreover, since there is a lot of space below the first bottom plate 116, the angle adjustment apparatus 100 in this embodiment has a more ample operating space to adjust the third adjusting member 150 compared with the arrangement of the first adjusting member 130 on one side of the first connection body 114, which can optimize use experience of the angle adjustment apparatus 100 according to the present disclosure.

In some embodiments, as shown in FIG. 6, the second connector 120 includes a second connection body 124 and a second bottom plate 125, the second bottom plate 125 and the second connection body 124 extend in different directions, and the second adjusting member 140 is arranged below the second bottom plate 125. Similar to the structure of the first connector 110, the second adjusting member 140 is arranged below the second bottom plate 125, which may also have a similar technical effect as described in the aforementioned embodiment.

Figure 9:
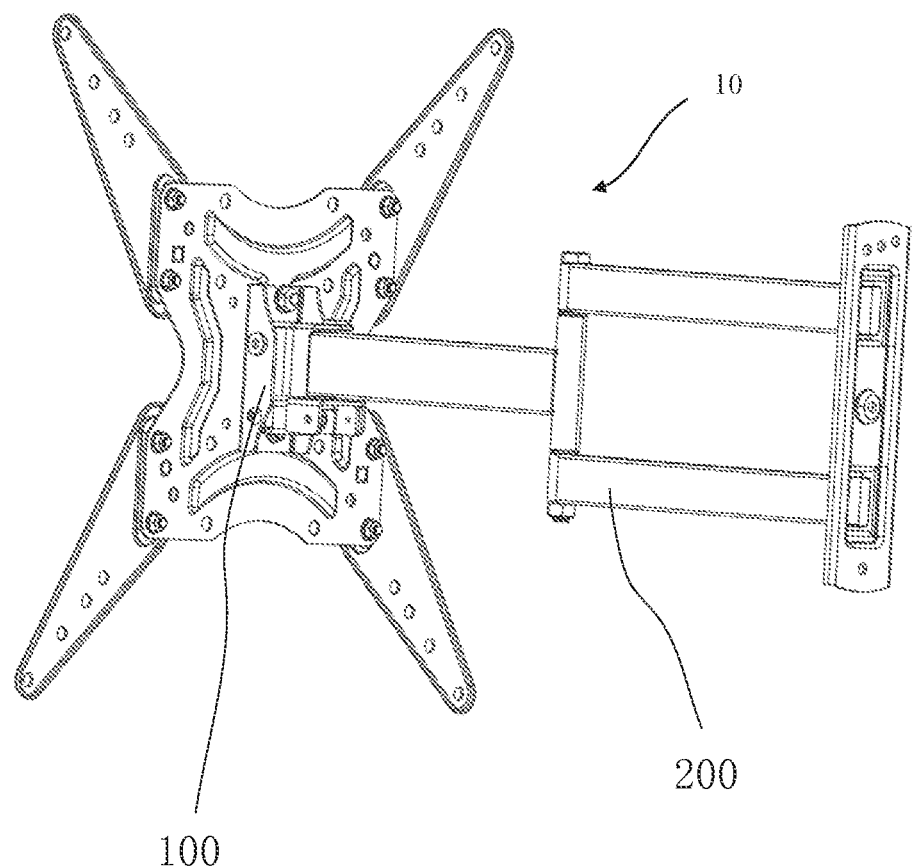
FIG. 9 is a schematic view of a TV mounting bracket according to an embodiment of the present disclosure.

In another aspect of the present disclosure, a television (TV) mounting bracket 10 is disclosed, which, as shown in FIG. 9, includes the angle adjustment apparatus 100 according to any one of the above embodiments and a connecting arm 200. The connecting arm 200 has one end connected to the angle adjustment apparatus 100 and the other end connected to a mounting surface such as a wall or ceiling. By use of the TV mounting bracket 10 according to the present disclosure, when a wall-mounted item is rotated horizontally and moved back and forth or up and down, due to the good structural stability of the angle adjustment apparatus 100, the set angle can remain basically unchanged, so as to provide users with good use experience.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. An angle adjustment apparatus, comprising:
    a first connector having a first end and a second end;
    a second connector having a third end and a fourth end, the third end of the second connector being rotatably connected to the first end of the first connector through a pivot shaft;
    a first adjusting member, the first adjusting member being connected to the second end of the first connector;
    a second adjusting member, the second adjusting member being connected to the fourth end of the second connector; and
    a third adjusting member configured to adjust a distance between the second end of the first connector and the fourth end of the second connector;
    wherein at least one of the first adjusting member and the second adjusting member is rotatably connected to the first connector corresponding thereto or the second connector corresponding thereto, and a rotation axis for a rotatable connection is parallel to the pivot shaft;
    wherein the third adjusting member comprises a threaded connector, a positioning structure, and a threaded structure; one of the first adjusting member and the second adjusting member is provided with the positioning structure and the other one of the first adjusting member and the second adjusting member is provided with the threaded structure, and both ends of the threaded connector are connected to the positioning structure and the threaded structure, respectively.

2. The angle adjustment apparatus according to claim 1, wherein the threaded connector is perpendicular to the pivot shaft.

3. The angle adjustment apparatus according to claim 1, wherein a tolerance is provided between the positioning structure and the threaded connector.

4. The angle adjustment apparatus according to claim 1, wherein the threaded connector comprises a bolt and a nut in threaded connection with the bolt, the positioning structure is a via hole, a head of the bolt and the nut are arranged adjacent to both sides of the via hole, respectively, and the threaded structure is a through screw hole.

5. The angle adjustment apparatus according to claim 1, wherein the positioning structure is a via hole, the threaded structure is an internal threaded sleeve, the threaded connector is provided with a limiting head at one end and a threaded segment at the other end; the threaded connector is provided with an assembly portion between the limiting head and the threaded segment, and the threaded segment is configured to be in threaded connection with the internal threaded sleeve.

6. The angle adjustment apparatus according to claim 1, wherein the first connector and the second connector are respectively provided with a first pivot connection portion and a second pivot connection portion, and the pivot shaft runs through the first pivot connection portion and the second pivot connection portion to allow a pivot connection between the first connector and the second connector.

7. The angle adjustment apparatus according to claim 1, wherein the pivot shaft comprises a pivot bolt and a pivot threaded sleeve; the pivot threaded sleeve and the pivot bolt each comprise a limiting end and a threaded connection segment connected to the limiting end, and the pivot threaded sleeve and the pivot bolt are connected to each other through the threaded connection segment.

8. The angle adjustment apparatus according to claim 1, wherein the first connector further comprises a first connection body extending in a vertical direction, the first connection body are respectively provided with a first top plate and a first bottom plate extending toward a same side at both ends of the first connection body, a third connector is arranged between the first top plate and the first bottom plate, and the first adjusting member is arranged below the first bottom plate.

9. The angle adjustment apparatus according to claim 1, wherein the second connector further comprises a second connection body and a second bottom plate, the second bottom plate and the second connection body extend in different directions, and the second adjusting member is arranged below the second bottom plate.

10. An angle adjustment apparatus, comprising:
    a first connector having a first end and a second end and configured to be connected to a mounting surface;
    a second connector having a third end and a fourth end and configured to be connected to a display device, the third end of the second connector being rotatably connected to the first end of the first connector through a pivot shaft; and
    an adjusting component connected to the first connector and the second connector and configured to adjust a distance between the first connector and the second connector;
    wherein when the adjusting component adjusts the distance between the first connector and the second connector, the fourth end of the second connector rotates with the adjusting component about a rotation axis parallel to the pivot shaft;
    wherein the adjusting component comprises:
        a first adjusting member connected to the second end of the first connector;
        a second adjusting member connected to the fourth end of the second connector; and
        a third adjusting member connected to the first adjusting member and the second adjusting member, wherein at least one of the first adjusting member and the second adjusting member is rotatably connected to the first connector corresponding thereto or the second connector corresponding thereto about the rotation axis;
        wherein both ends of the third adjusting member are threaded through and connected to the first adjusting member and the second adjusting member; an extension direction of the third adjusting member is perpendicular to the pivot shaft, and when the distance between the first connector and the second connector is adjusted, the third adjusting member rotates in the extension direction thereof.

11. The angle adjustment apparatus according to claim 10, wherein a tolerance is provided between the first adjusting member and the third adjusting member.

12. A television (TV) mounting bracket, comprising the angle adjustment apparatus according to claim 1 and a connecting arm, the connecting arm having one end connected to the angle adjustment apparatus and the other end connected to a mounting surface.

13. A TV mounting bracket, comprising the angle adjustment apparatus according to claim 10 and a connecting arm, the connecting arm having one end connected to the angle adjustment apparatus and the other end connected to the mounting surface.

* * * * *